Patented Feb. 12, 1935

1,990,991

UNITED STATES PATENT OFFICE 1,990,991

ELECTRIC CUTTER FOR CEILINGS, WALLS, AND THE LIKE

Ernest Heubach, New York, N. Y.

Application April 25, 1934, Serial No. 722,327

12 Claims. (Cl. 72—128)

This invention relates to new and useful improvements in an electric cutter for cracks in ceilings and walls of plaster, etc.

The invention has for an object the construction of a device as mentioned which is characterized by its ability to absorb dust and small particles produced when cutting out the plaster of a wall.

Still further, the invention proposes the arrangement of a tubular casing open at the front end and having a partition dividing it into front and rear compartments, the arrangement of an electric motor in the closed rear compartment having its shaft coaxially entering into the front of said casing, and a cutting tool arranged upon the front of said shaft for cutting the plaster of a crack.

Furthermore, the invention contemplates the provision of a hollow conduit connecting the front compartment with the inlet of a dust bag collector, and the provision of a suction fan on the shaft drawn through the front of the casing and discharge through said conduit.

Furthermore, as another object of this invention it is proposed to arrange a baffle within the front of the casing to coact with the action of the suction fan in moving air through the conduit.

Still further, it is proposed to provide a thrust bearing for the motor so as to take up the thrust due to operating the cutting tool.

Another one of the objects of this invention is the arrangement of telescopic shaft sections composing the front portion of the shaft for said tool, and a mechanism for telescopically moving said shaft sections to extend or retract the cutting tool relative to the front of the casing.

Furthermore, the mechanism is also proposed for latching the telescoping shafts in various extended positions.

The invention also contemplates an arrangement whereby a grinding tool such as a sandpaper disc may be substituted for the cutting tool.

As another object of this invention it is proposed to construct a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a longitudinal sectional view of a device constructed according to this invention.

Fig. 2 is a fragmentary view of the front portion of Fig. 1 but illustrating a different tool substitute.

Fig. 3 is a fragmentary view of a portion of Fig. 1 but illustrating a modification of the invention.

Fig. 4 is a side elevational view of another type of cutting tool for the device.

The electric cutter for cracks in ceilings, walls, etc., comprises a tubular casing consisting of a front casing section 10 detachably connected with a rear casing section 11, said casing being provided with a front open end 12 and also being provided with a partition 13 for dividing it into a front compartment and a closed rear compartment. An electric motor 14 is arranged within the closed rear compartment of the casing and has its shaft 15 extending exactly through the center of the casing. A cutting tool 16 is detachably mounted upon the end of the shaft 15. A hollow conduit 17 connects the front of the casing with the inlet 18 of a dust bag collector 19. A suction fan 20 is arranged upon the shaft 15 for drawing through the front of the casing and discharging through the conduit 17.

The cutting tool 16 is shown of conical shape and comprises a plurality of radial blades, and is formed with a threaded stud 21 at the rear end adapted to engage into a threaded aperture formed in the end of the shaft 15. The cutting tool 16ª in Fig. 4 is similarly constructed but is of substantially hemispherical shape. A spider construction 22 is mounted within the front end of the casing and has openings for the passage of air, and a hub portion 23 equipped with a bearing 24 for the shaft 16. A baffle plate 25 is arranged within the front portion of the casing and acts in conjunction with the suction fan 20 to direct the discharge through the conduit 17. More particularly, the suction fan 20 is of the centrifugal type having a central inlet and discharging in the periphery. The conduit 17 engages into the casing at a peripheral portion of the suction fan. A boss 26 is formed on the side of the casing into which the end of the conduit 17 engages.

The conduit 17 is in the form of a handle by which the device may be supported and manipulated. The rear of the conduit 17 terminates in a portion 28 which is attached upon the rear closed end of the casing section 11. The portion 28 is also provided with a flange 29 which connects with the inlet 18 of the dust bag collector. A suitable arrangement is provided so that the inlet 18 may be separated from the flange 29.

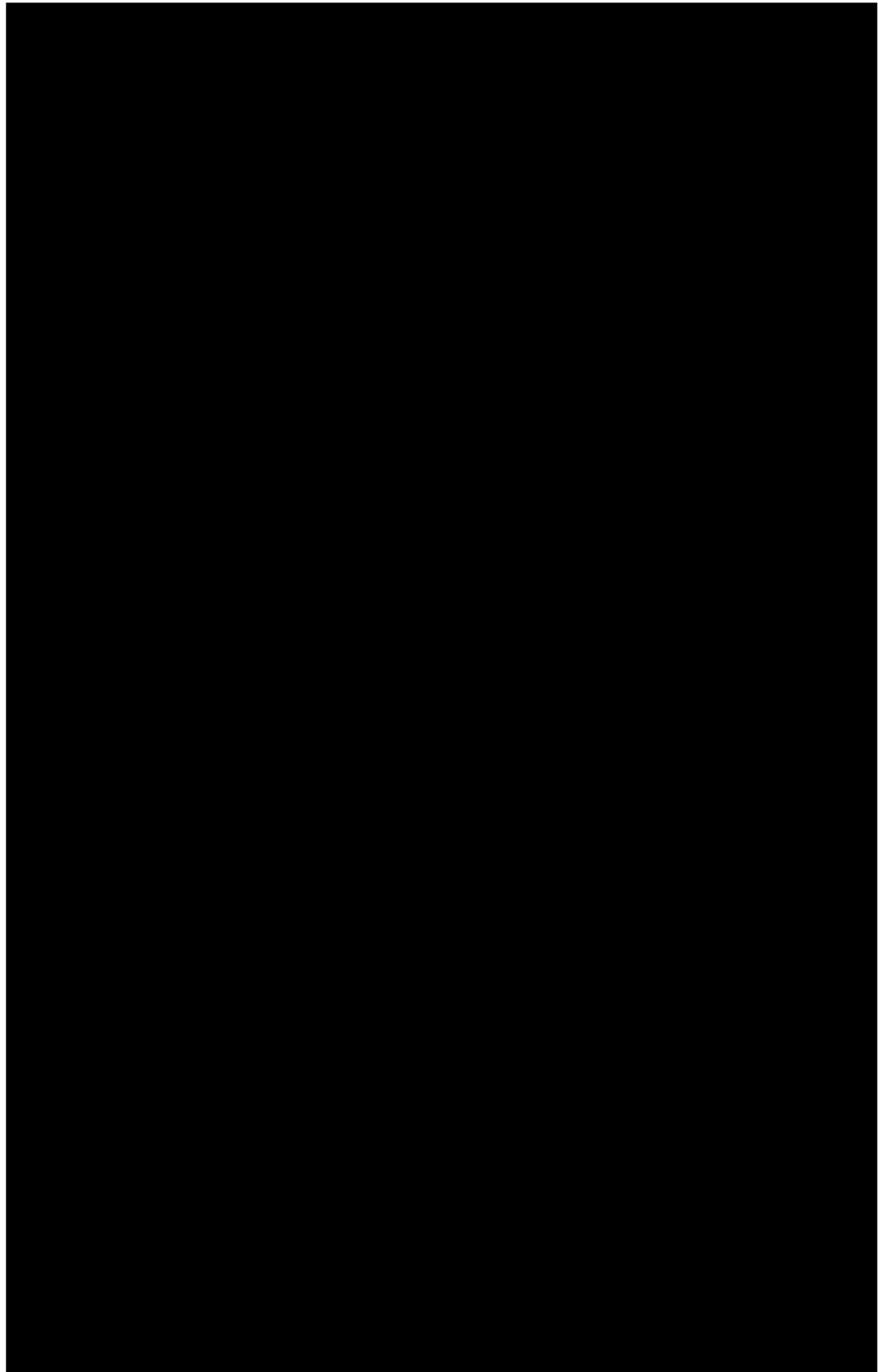

The casing section 11 has a reduced shoulder 30 at the front end upon which the rear end of the casing section 10 engages. Frictional means or other means may be provided for holding these casing sections together. Several bent openings 31 are formed in the casing section 11 to prevent overheating of the motor. A fan 32 is mounted upon the shaft 15 of the motor so as to produce